United States Patent

Amon et al.

[11] Patent Number: 6,116,740
[45] Date of Patent: Sep. 12, 2000

[54] TIR WINDOW

[75] Inventors: Max Amon, Maitland; Clifford J. Luty, Orlando, both of Fla.

[73] Assignee: Lockheed Martin, Bethesda, Md.

[21] Appl. No.: 06/612,194

[22] Filed: May 21, 1984

[51] Int. Cl.$^7$ .............................. H01Q 15/02; G02B 3/00
[52] U.S. Cl. ...................... 359/503; 359/222; 359/593; 359/613; 359/894
[58] Field of Search ........................... 350/311; 455/602, 455/611, 617; 332/7.51; 359/222, 503, 593, 613, 894

[56] References Cited

U.S. PATENT DOCUMENTS

| | | | |
|---|---|---|---|
| 3,808,428 | 4/1974 | Barry et al. | 455/615 |
| 4,088,884 | 5/1978 | Rast et al. | 455/611 |
| 4,217,026 | 8/1980 | Radovich | 350/580 |
| 4,302,796 | 11/1981 | Gustavson et al. | 350/485 |

FOREIGN PATENT DOCUMENTS 2533697  2/1977  Germany ................ 455/611

OTHER PUBLICATIONS

Linlor, W.I.; "Baffle System Employing Reflective Surfaces"; pp 1–34, NTIS N84–13985/6; abst. supplied.

*Primary Examiner*—Nelson Moskowitz
*Attorney, Agent, or Firm*—Julian C. Renfro, Esq.; Gay Chin, Esquire

[57] ABSTRACT

A window for utilization in the receiving of intelligence from a modulated beam of collimated light, with the window being configured to restrict the field of view of the optical system used therewith, and employing the phenomenon of total internal reflection. Such a window may be used to reject the entry of unwanted radiation, such as noise, and comprises first and second generally triangularly shaped wedges of optical material. The entry face of the first wedge is generally perpendicular to a base plane, and its rear face is disposed at an acute angle to the entry face. The entry face of the second wedge is disposed at the same angle to the base plane as the rear face of the first wedge, and the two wedges are separated by a small air gap. Preferably, the rear face of the first wedge is contoured to reject incoming radiation from a direction below the base plane, with comparable contouring of the closely adjacent faces of the first and second wedges serving to permit the entry of intelligence in the form of skew rays, thus to substantially increase the directions in which desired radiation may be admitted to the optical system.

7 Claims, 3 Drawing Sheets

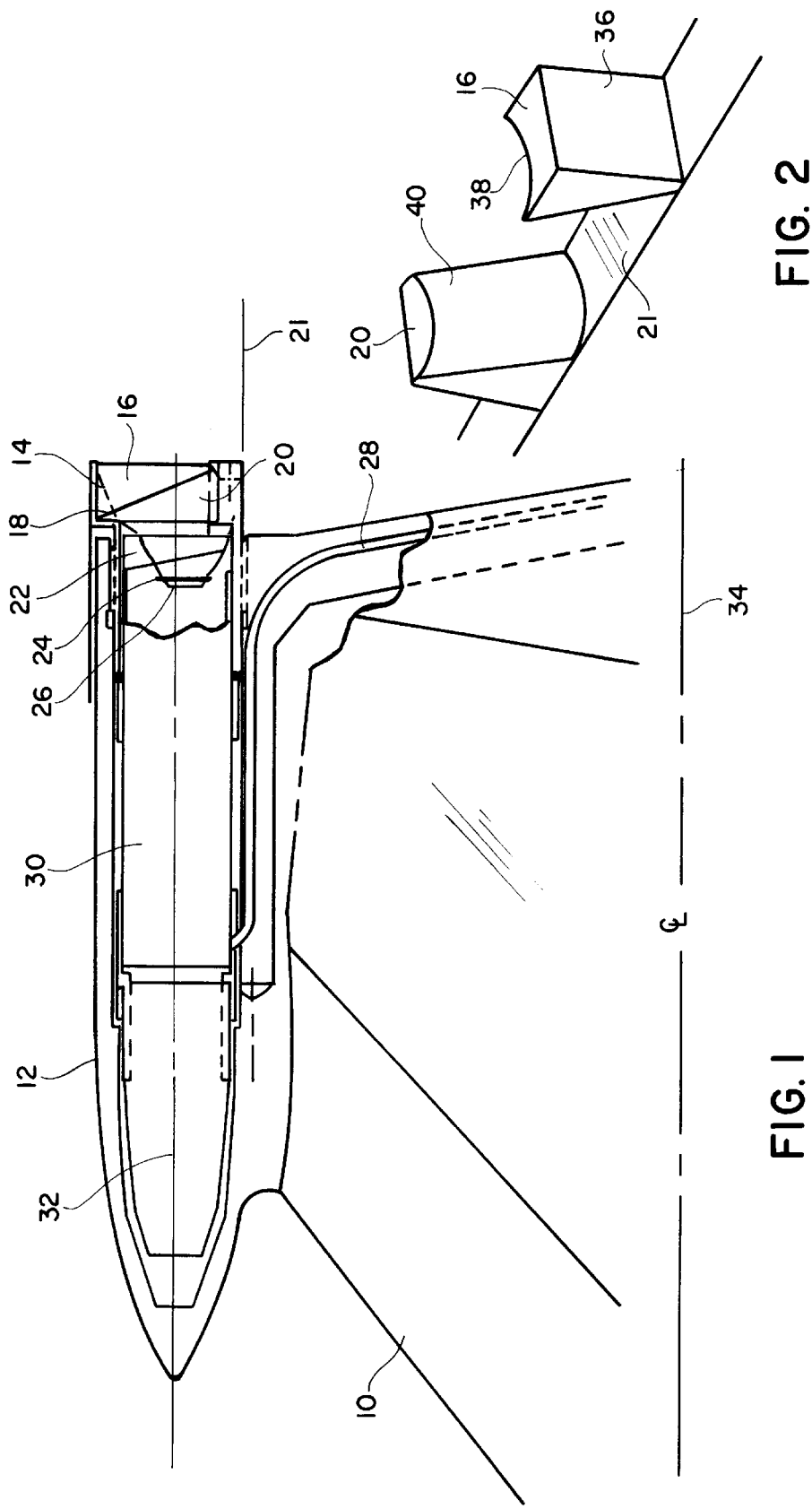

TIR WINDOW

BACKGROUND OF THE INVENTION

It is well known in the art to provide missiles with receivers so that transmitted guidance signals can be reliably received, which guidance signals can serve to guide the missile to intercept a selected target.

One such missile system of particular interest to the present invention involves the transmission of laser guidance signals, which are received by one or more aft looking receivers located on the rear of the missile to be guided. By this arrangement, precise guidance information can be readily provided to the missile, such that it can be guided to intercept an enemy aircraft or missile, with this being accomplished in a way that make effective enemy countermeasures difficult to achieve.

In this missile system of interest, a detector used by the missile receiver needed to be placed comparatively close to the motor of the missile, but unfortunately, it was then found that the plume of radiant energy emanating from the motor gave rise to noise that overshadowed the guidance signals sought to be received by the detector.

One originally considered solution to the problem of removing the motor plume from the field of view of the detector involved the use of a metal shield protruding along the missile axis between the detector and the exhaust nozzle. However, in order for such a shield to be able to accomplish its purpose, it by necessity had to protrude several inches beyond the limiting envelope of the missile, and this became quite unacceptable from the aerodynamic standpoint.

Certain optical solutions to the problem posed by the motor plume were also proposed, but it was found that a conventional lens system had a focal length to diameter ratio as to make it impractial, as would greatly diminish the level of guidance signals that could be received at the detector. Consequently, it became apparent that the best approach involved the use of an optical wedge arrangement of a configuration such that undesirable radiant energy could be successfully blocked from reaching the detector.

In accordance with one aspect of this invention, we utilize an optical window formed from two wedges with an air gap therebetween. In that way, energy from within a desired field of view can pass through such window, while unwanted energy, coming in from a different angle, strikes the internal surfaces between the wedges, such that the critical angle is exceeded. This energy may, for example, emanate from engine exhaust, and it will be totally reflected internally, and absorbed by the outer walls of the window.

A number of prior art devices have utilized frustrated internal reflection filters or couplers, and one such device teaches the use of a pair of wedges having a gap between the angled surfaces, which gap may be electrically varied. This functions to open and close the air gap, and can therefore be used as a modulator to alternately pass or cut off radiation passing through the unit. Other teachings involve the input member being made of a different material than the output member, thus to accomplish a type of filtering.

Still another prior art device teaches the use of a wedge shaped spectral filter utilized to separate two different frequency signals by reflecting one signal from the top slanted surface and the other signal from the bottom slanted surface.

The approach we utilized to accomplish the goals of this invention differs significantly from these earlier approaches.

SUMMARY OF THIS INVENTION

Total internal reflection is a well known phenomenon that is utilized in a special way in accordance with this invention. We utilize a first wedge serves to displace incoming radiation away from the axis of the missile, but then we utilize a second wedge, spaced slightly away from the first, that recaptures the incoming radiation, and redirects it substantially along the direction of its original path.

Between the rear edge of the first wedge, and the front edge of the second wedge is a suitably small air gap. As a result, the rear edge of the first wedge serves to reflect light energy emanating below the angle of zero degrees, that is, light energy from the area of the longitudinal axis of the missile, where the principal portion of the motor plume is located. Such light energy from below zero degrees is reflected and absorbed in the walls of the TIR window.

Special filters are utilized to reject radiation of every wavelength except radiation at 10.6 $\mu$m, so therefore we are assured that guidance signals transmitted to the missile would be received at its detector.

By the appropriate utilization of a biasing wedge, we initially were able to obtain an 80° field of view, 60° away from the axis of the missile, and 20° toward the axis of the missile. This arrangement was satisfactory from some standpoints, but was unsatisfactory in that some guidance information sought to be received was not able to get through.

We found that the use of two ordinary flat wedges, spaced a slight distance apart, brought about a loss of guidance information because it resulted in a curved, bowl-shaped field of view. We have combatted this unfortunate characteristic by utilizing in accordance with this invention, a pair of interfitting wedges whose adjacent surfaces are ground so as to be complementary, and generally cylindrical. A slight air gap, as before, is utilized between these adjacent cylindrical surfaces, and desired radiation passing through the first wedge will be almost immediately intercepted and passed along to the second wedge, which redirects the radiation rearwardly toward the detector. However, undesired radiation, principally from the motor plume, is effectively prevented from reaching the detector.

Because of the highly advantageous curvature ground onto the adjacent surfaces of the first and second wedges, desired incoming information will be received over a wide field of view, and have a very desirable cutoff point. Most importantly, because of the use of the wedges curved in accordance with this invention, desired radiation coming in from above or below the plane of the fin, called "skew rays," is not lost.

As is therefore to be seen, it is a primary object of this invention to provide a total internal reflection window for a missile, that will accept guidance information from a wide sector, but reject all undesired radiation.

It is another object of this invention to provide a pair of wedges functioning as a TIR window but cylindrically ground to minimize loss of information coming in as skew rays.

BRIEF DESCRIPTION OF DRAWINGS

FIG. 1 is a partial view of the fin of a missile, with the outermost end of the fin being sectionalized to reveal internal construction, and in particular, our TIR window;

FIG. 2 is a fragmentary perspective view of a preferred embodiment of our novel wedge-shaped optical components, with the wedges here having been moved away from the operative relationship, and into a wide spacing in order that the configuration of their abutting faces can be revealed;

DETAILED DESCRIPTION

Figure 3:
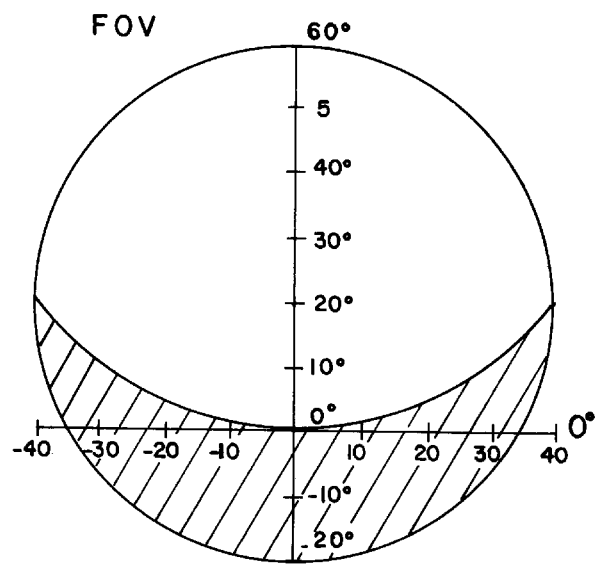
FIGS. 3 through 5 are related figures revealing the field of view through our wedges as the amount of cylindrical curvature of the abutting faces of the wedges is increased.

Turning to FIG. 1, it will be seen that we have there provided, a fragmentary portion of the fin of a missile, such as the right hand fin, with other portions of the missile not being shown because of their lack of pertinence. The fin 10 may support at its outer end, a contoured portion 12 in the nature of a pod or the like, in the aft end of which is contained our TIR window 14.

Although we discuss our invention only in terms of the right fin and the TIR window utilized therein, it is to be understood we utilize a very similar, if not identical, arrangement in the left fin of the missile.

A first wedge 16 of the TIR window is disposed to initially receive the guidance information from the ground station. This entering energy may be from a $CO_2$ laser, and after passing through the first wedge, then passes through an air gap 18, and thereafter through the second wedge 20. This second wedge serves to prevent the diverting of this entering energy off at an angle, and directs it straight back toward the detector. Wedges 16 and 20 bear a definite relationship to a base plane 21, as will be discussed hereinafter. Plane 21 is parallel to the centerline 34 of the missile and its propulsion motor, and perpendicular to the plane of fin 10. Inasmuch as the outside temperature may be as high as 2000° F. due to the closeness of the missile exhaust, we have selected zinc selenide in the construction of the components of our window, because it is an infrared material that will transmit the laser wavelengths, yet remain relatively unaffected by large temperature changes.

After leaving the second wedge, the light energy passes through a gap or space, and then enters the biasing wedge 22. This biasing wedge serves to place the cone of vision at a desirable angle. In one particular arrangement of considerable interest to this invention, the field of view of the receiver was 80°, and the biasing wedge serves to shift the field of view 20° in yaw, so that the receiver would be directed only 20° toward the missile centerline, but 60° away from the centerline. After leaving the biasing wedge 22, the entering light energy passes through narrow bandpass filter 24, and then strikes detector 26.

Inasmuch as the guidance information from the ground station of particular interest to this invention is, as previously mentioned, from a $CO_2$ laser operating at 10.6 $\mu$m, the detector operation is restricted to a limited spectral range by the narrow bandpass filter 24 being peaked at the $CO_2$ laser wavelength.

We prefer, but are not limited to, a detector 26 of HgCdTe, and because of its special characteristics, we mount it on a cold tip (not shown), and enclose it in a dewar (not shown). Up until the time of launch, a continuous quantity of argon gas flows from tube 28 into the cooler for the detector, so that the detector will desirably be maintained at a temperature of 90° K. The tube 28 is disposed on an aft portion of the fin 10, as depicted in FIG. 1.

The receiver 30 we use may be regarded as the receiver portion of a laser communications link, and used therewith is preamplifier assembly 32. The receiver and preamp assemblies are supported in quad rings in order to reduce microphonics. However, it is to be realized that the immediately foregoing details are only provided by way of background, and do not represent a significant aspect of our TIR window invention.

The TIR window 14 in accordance with this invention is thus principally constituted by the first wedge 16, and second wedge 20, these being separated by the aforementioned air gap 18. Wedge 16, as viewed in FIG. 1, is generally in the configuration of a triangular solid, with its entry face 36, as shown in FIG. 2, preferably being perpendicular to base plane 21. However, FIG. 2 reveals that the contour of angled rear face 38, located on the other side of wedge 16 from entry face 36, possesses a concave contour, and is disposed at an angle to the base plane 21 that is greater than 45°, but less than 75°.

The angled front face 40 of the wedge 20 will be seen to possess a convex configuration, or more accurately, the face 40 may be regarded as part of a cylinder, created using a radius of approximately 1.5 inches. Importantly, the angle the front face 40 makes with plane 21 is the same as the angle the rear face 38 of wedge 16 makes with plane 21. Also of importance is the fact that the same radius used in the creation of the convex face 40 is used in the creation of the concave rear face 38 of wedge 36. Thus, when the wedges are moved into their operative relationships, they would perfectly interfit, except that we separate the wedges very slightly, to form an air gap of say 0.002 inches.

The rear face 38 of the first wedge 16 is responsible for the rejection of energy emanating from below a zero degree angle, that is, below plane 21, so the wedge relationship we use can be regarded as effectively eliminating radiation from an undesired direction, such as from below zero degrees, or in other words, from the area of the motor exhaust, disposed on the longitudinal centerline of the rocket.

It is to be realized that cylindrical surfaces on the abutting faces of the wedges are the general case, whereas flat surfaces on the wedges are a special case. If, for example, the first wedge is equipped with a flat rear surface, its angle to the base plane is set commensurate with the TIR dependency upon wavelength of interest, the material used in the construction of the wedges, and the cutoff angle at which total internal reflection is to take place.

Consider the formula:

$$\frac{N}{N'} = \operatorname{Sin} \theta'$$

where N is the index of refraction of air, and N' is the index of refraction of the wedge material. If zinc selenide is the selected wedge material, and the radiation to be received is at 10.6 $\mu$m, the index of refraction N' is 2.4034, and Sin $\theta'$ is thus 0.416077. In this instance, $\theta'$ becomes 24.6°, which is the angle made with the perpendicular to base plane 21.

The use of flat wedges, as mentioned earlier, results in the creation of a bowl-shaped field of view, as illustrated in FIG. 3. Although this does not diminish the amount of desired radiation entering the TIR window from directly behind, it does seriously diminish the entry of skew rays, which are defined as rays entering at an angle to the TIR window, from either above or below the plane of the fin 10 and the TIR window. As is obvious, because of the wide range of possible attitudes of the missile with respect to the ground station at any given moment, desired information from the ground station may at that moment be entering the TIR window at an angle.

Figure 4:
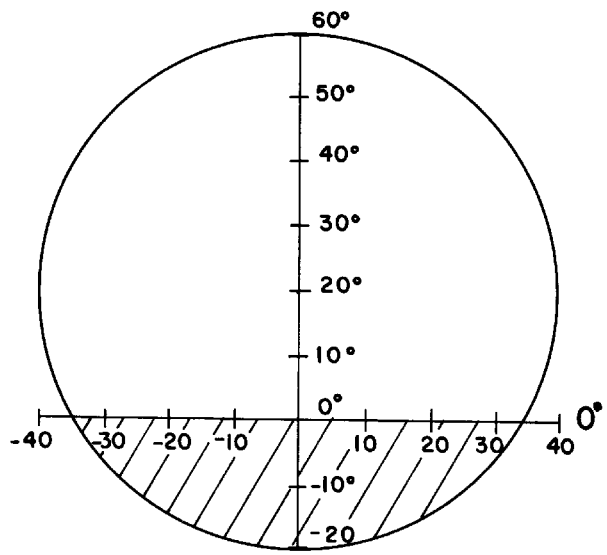
Figure 5:
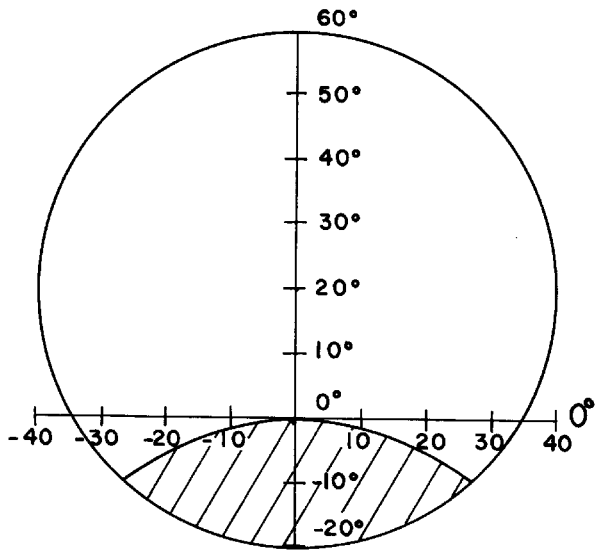

Rather than utilizing flat wedges, and their attendant disadvantages, we prefer for the wedges 16 and 20 to be cylindrically curved in the manner illustrated in FIG. 2. This has the direct result of a horizontal cutoff line, as shown in FIG. 4, thus eliminating the considerable loss attendant the use of the flat wedges, as mentioned in connection with FIG. 3. If we use a radius in the creation of surfaces 38 and 40 that is smaller than the optimum, that will create a curved cutoff line, as indicated in FIG. 5.

Figure 6:
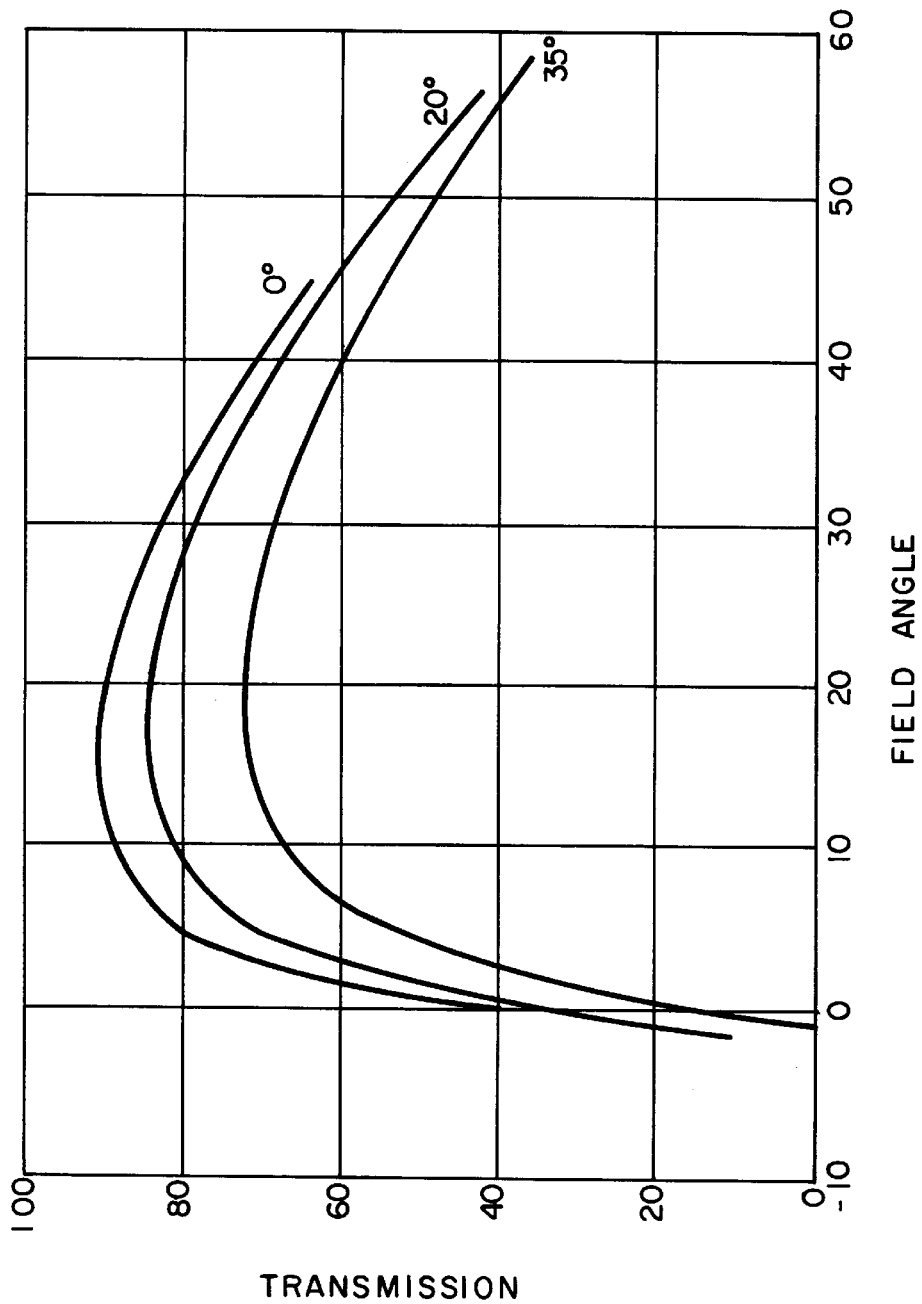
FIG. 6 is a graph of transmission versus field angle, with three different curves being utilized in order to reveal transmissivity of our novel wedges at zero degrees, 20 degrees, and 35 degrees to the plane of the paper.

Referring to FIG. 6, we there show three generally similar curves, respectively representing transmissivity of our novel curved wedges at zero degrees, 20 degrees, and 35 degrees to the plane of the paper. In the zero degree curve, we obtain the desired cutoff at approximately the zero degree point, with transmissivity varying with look angle. It is to be noted that the incident energy as given in this zero degree curve will result in increased transmission loss in normal incident radiation. It is to be noted from FIG. 3 that the center of the "bowl" is at approximately the same location as the straight line of FIG. 4, which means that the zero degree curve of FIG. 6 would not be significantly different, even if flat wedges had been used.

Referring to the 20° curve of FIG. 6, it is to be realized that this curve depicts the transmissivity of our window when skew rays are entering, in this instance at an angle of 20° to the plane of the paper. Significantly, the transmissivity is only slightly less than for the zero degree curve, and the cutoff is still very near the zero degree location. In contrast to this curve, if flat wedges had been used, the left edge of this curve would have been at say the 15 degree location.

In the 35° curve of FIG. 6, we depict the transmissivity of skew rays entering from an angle 35° above or below the plane of the paper, and the steep left side of the curve is still very near the zero line location. If flat wedges had been used, the curve would have been shifted far to the right, meaning that a considerable percentage of the desired radiation from the ground station would not have gotten through.

We claim:

1. A window for utilization in the receiving of intelligence from a modulated beam of collimated light, which window is configured to reject the entry of unwanted radiation, said window comprising first and second generally triangularly shaped wedges of optical material separated by a small air gap, said first and said second wedges each having an entry face and a rear face, said rear face of said first wedge being disposed at an acute angle to said entry face, the entry face of said second wedge being disposed at the same angle to the base plane as the rear face of said first wedge, the rear face of said first wedge being contoured to reject incoming radiation from a direction below said base plane.

2. A window for utilization in the receiving of intelligence from a modulated beam of collimated light, which window is configured to reject the entry of unwanted radiation, said window comprising first and second generally triangularly shaped wedges of optical material separated by a small air gap, the entry face of said first wedge being generally perpendicular to a base plane, and the rear face thereof being disposed at an acute angle to said entry face, the entry face of said second wedge being disposed at the same angle to the base plane as the rear face of said first wedge, the rear face of said first wedge being contoured to reject incoming radiation from a direction below said base plane, with comparable contouring of the closely adjacent faces of said first and second wedges serving to allow the entry of incoming intelligence in the form of skew rays, thus to substantially increase the directions in which desired radiation may be admitted, when compared with skew ray radiation admitted by comparable planar wedges.

3. The window as recited in claim 2 in which said closely adjacent faces of said first and second wedges are cylindrical surfaces each cut utilizing substantially the same radius.

4. The window as in claim 3 wherein the rear face of said first wedge is concave, and wherein the angle said concave rear face makes to a perpendicular to said base plane is approximately 26° when the wedge material is zinc selenide used to receive 10.6 micro meter radiation.

5. A window for utilization in the receiving of intelligence from a modulated beam of collimated light, which window is configured to reject the entry of unwanted radiation, said window comprising first and second generally triangularly shaped wedges of optical material separated by a small air gap, the entry face of said first wedge being generally perpendicular to a base plane, and the rear face thereof being disposed at an acute angle to said entry face, the entry face of said second wedge being disposed at the same angle to the base plane as the rear face of said first wedge, the entry face of said second wedge being further contoured so as in effect to form a part of a convex cylinder, and the rear face of said first wedge being contoured so as in effect to form a part of a concave cylinder of the same radius at which the entry face of said second wedge was contoured, the rear face of said first wedge serving to reject incoming radiation from a direction below said base plane, with the cylindrical contouring of the closely adjacent faces of said first and second wedges serving to allow the entry of incoming intelligence in the form of skew rays, thus to substantially control the directions in which radiation may be admitted, when compared with skew ray radiation admitted by comparable planar wedges.

6. The window as recited in claim 5 in which the surfaces of said wedges are cylindrical surfaces each cut utilizing substantially the same radius.

7. The window as in claim 5 wherein the angle the concave rear face of said first wedge makes to a perpendicular to said base plane is approximately 26° when zinc selenide is the material of which the wedges are made, and the radiation is at 10.6 micro meters.

* * * * *